(No Model.) 2 Sheets—Sheet 1.
H. M. JONES.
ELECTRIC RAILWAY.
No. 584,639. Patented June 15, 1897.
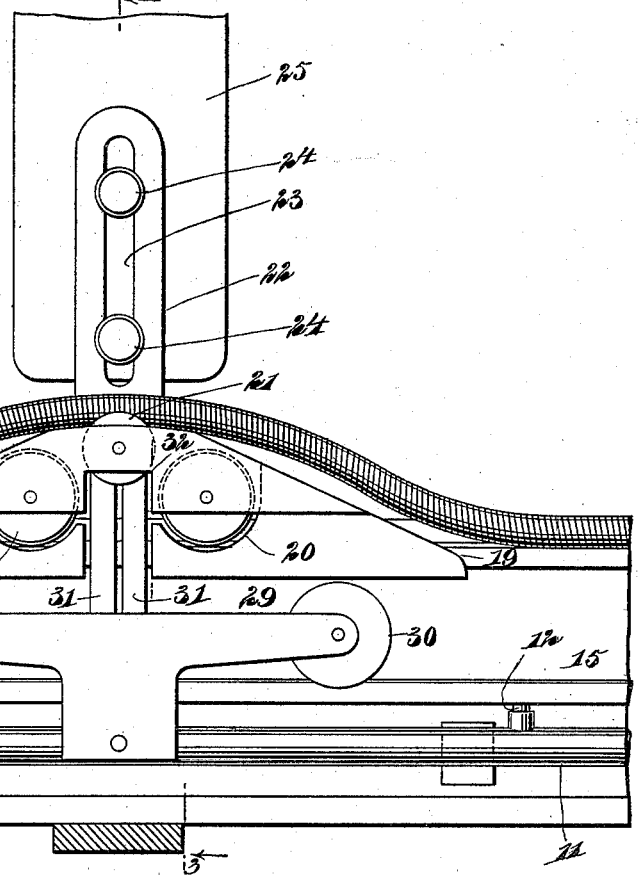
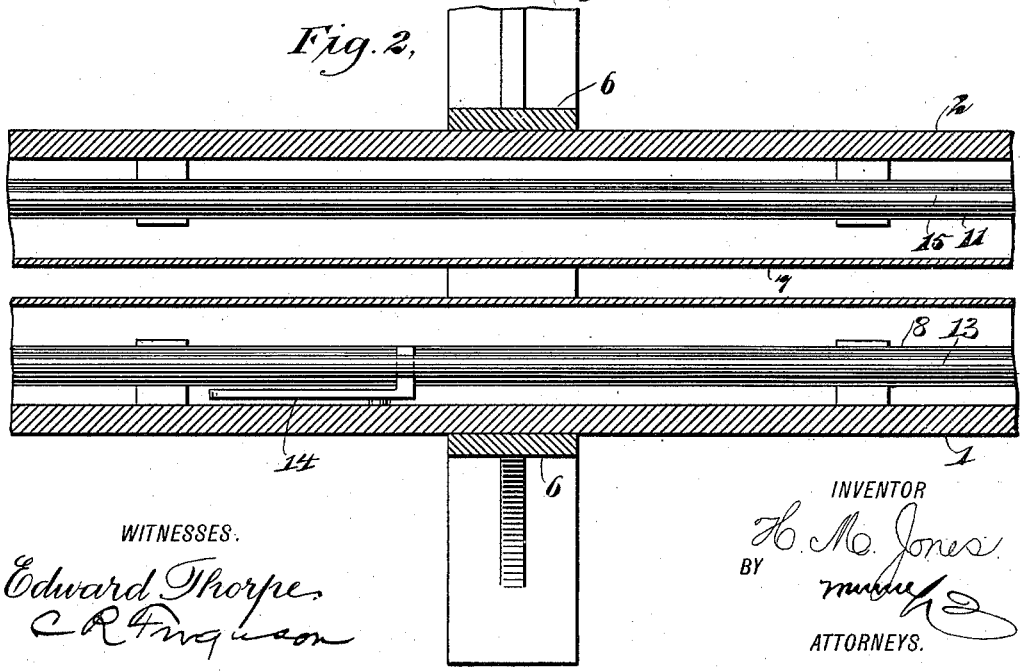
WITNESSES.
Edward Thorpe
C. R. Ferguson
INVENTOR
H. M. Jones
BY
ATTORNEYS.
THE NORRIS PETERS CO., PHOTO-LITHO., WASHINGTON, D. C.

(No Model.) 2 Sheets—Sheet 2.

H. M. JONES.
ELECTRIC RAILWAY.

No. 584,639. Patented June 15, 1897.

WITNESSES:
Edward Thorpe.
C. R. Ferguson

INVENTOR
H. M. Jones.
BY
ATTORNEYS.

UNITED STATES PATENT OFFICE.

HENRY M. JONES, OF MERIDEN, CONNECTICUT, ASSIGNOR OF ONE-HALF TO DEXTER E. PHELPS, OF SAME PLACE.

ELECTRIC RAILWAY.

SPECIFICATION forming part of Letters Patent No. 584,639, dated June 15, 1897.

Application filed August 12, 1896. Serial No. 602,546. (No model.)

*To all whom it may concern:*

Be it known that I, HENRY M. JONES, of Meriden, in the county of New Haven and State of Connecticut, have invented new and useful Improvements in Electric Railways, of which the following is a full, clear, and exact description.

This invention relates to electric railways of the class in which the current-carrying devices are located in a conduit beneath the track-rail, and the object is to provide a very simple but comparatively inexpensive construction of railway system and in which the danger of accident from contact with live wires is practically overcome, and, further, to provide a light yet strong device for normally closing the slot of the conduit.

I will describe an electric railway embodying my invention, and then point out the novel features in the appended claims.

Reference is to be had to the accompanying drawings, forming a part of this specification, in which similar characters of reference indicate corresponding parts in all the views.

Figure 3:
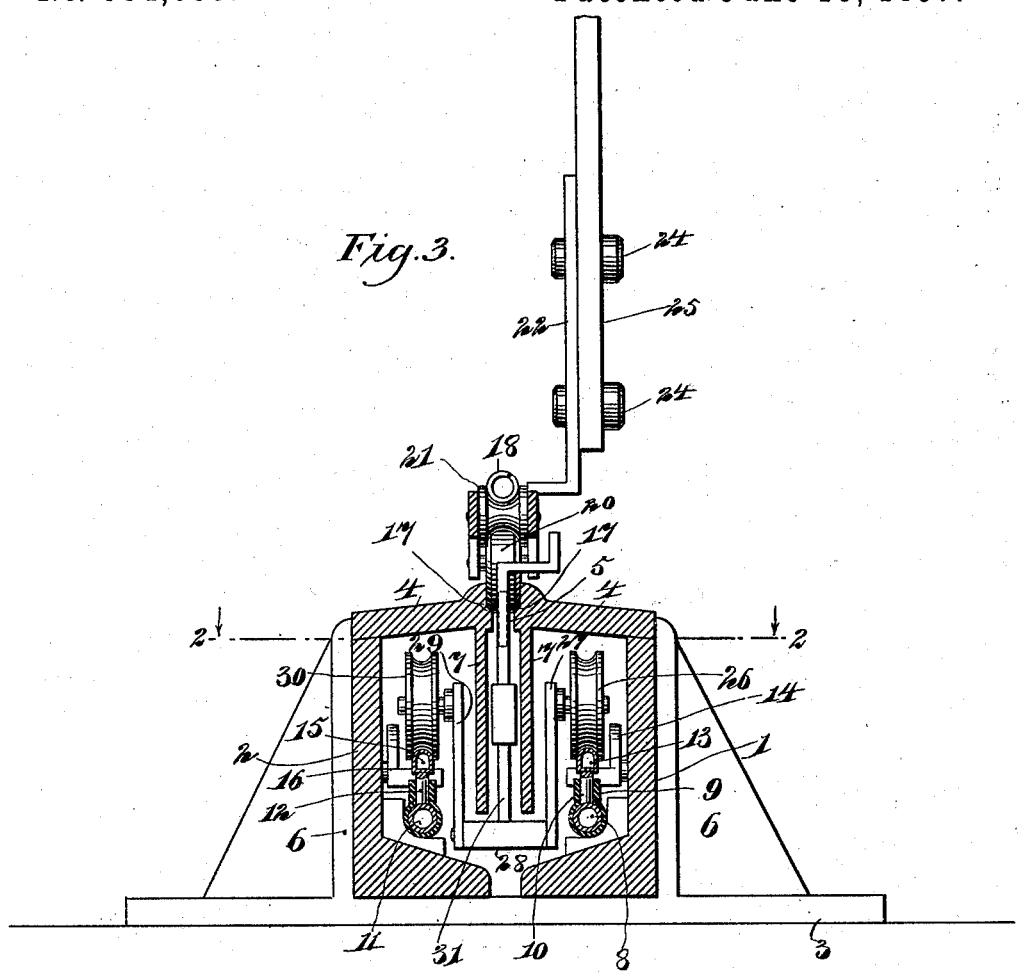
Figure 4:
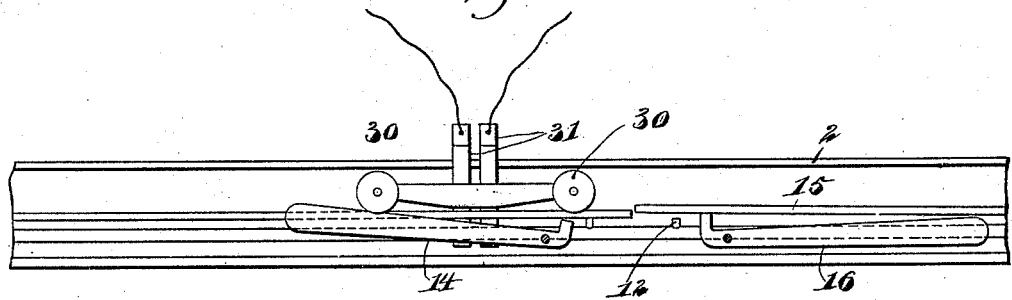

Figure 1 is an elevation and partial section of a system embodying my invention. Fig. 2 is a partial plan and partial section on the line 2 2 of Fig. 3. Fig. 3 is section on the line 3 3 of Fig. 1; and Fig. 4 is an elevation similar to Fig. 1, but showing additional features.

The conduit comprises two sections 1 2, extended longitudinally between the rails of a track and comprising base-flanges, which rest upon ties or sills 3, and top flanges 4, having a space between their adjacent edges, forming a slot-opening 5. These conduit-sections are supported between brackets or arms 6, extended upward from the ties or sleepers 3, and depending within each section at the sides of the slot-opening 5 is a guard-plate 7. These guard-plates 7 have their lower edges extended considerably below the collecting-rails to be hereinafter described.

Arranged within the conduit and at one side thereof is a main electric conductor 8, which is preferably of tubular construction, as such construction is much cheaper and more easily handled than solid wires. The main electric conductor 8 is provided with a suitable insulating-covering, and at intervals it has upwardly-projected sleeves of insulating material 9, through which metal contact-posts 10 extend, the lower ends of said posts being of course in electrical connection with the conductor 8, and the upper ends of said posts are exposed. The return-current is conveyed on a tubular conductor or wire 11, suitably insulated on its outer side and having contact-posts 12, extended upward from it through insulating-sleeves. This return-conductor is similar to the conductor 8, but it is to be understood that I do not limit my invention thereto, as it is obvious that the return-current may be carried through the ground or through one of the rails of the track in the usual manner.

Mounted to swing vertically over the main conductor 8 is a working conductor 13, made in sections of suitable length—such, for instance, as the length of a car. The several sections of the working conductor 13 are designed to make and break contact with the posts 10. As here shown, each section is mounted at its ends on levers 14, the said levers being pivoted to one of the conduit-sections and having their shorter ends extended underneath the section 13. Each lever 14 has sufficient weight to normally move its respective section of the conductor 13 upward out of contact with the posts 10 and hold them in such position. A return working conductor 15 is mounted on pivoted levers 16 in the manner first described and adapted to be engaged with the posts 12, which have connection with the return-conductor 11. These working conductors 13 and 15 are preferably made tubular, as is also the conductor 11, so that their weight will be materially reduced. Therefore these tubular rails will not only be more easily handled, but they may be operated by levers 14 and 16 of comparatively light weight, thus reducing the expense of construction in this particular. The trolley is arranged to roll over the working conductors, so as to depress them against the tendency of the levers 14 and 16 and to cause the sections of the working conductors to contact with their respective feeders.

The adjacent faces of the flanges 4 of the conduit are provided with flanges 17, which form seats or supports for a slot-closing cable 18—that is, this cable 18 by resting in the slot 5 will be prevented from falling into the conduit by means of said flanges. These flanges also serve as tracks upon which rollers of a cable-lifter engage, as will be hereinafter described.

The cable 18 is designed to normally close the slot 5, and this cable I prefer to construct in the form of a flexible tube made by turning a wire spirally. This construction of cable will be very light, yet sufficiently strong to withstand any weight that might be imposed thereon. The coils of the cable are arranged to engage one against another, so as to prevent the entrance of dirt or slush and the like material into the conduit, but the said spiral coil will open and stretch at places engaged by the lifting device or plow carried by a car. This lifting device or plow comprises a frame 19, extended through the slot 5, and tapered from its central top portion downward to each end. This frame 19 is supported on rollers 20, which run on the track formed by the flanges 17, and the central portion of this lifting device or plow is provided with a grooved roller 21, designed to engage the under side of the cable 18.

In order that the lifting device or plow may not be lifted bodily upward through the undulating movements of a car, I provide a sliding connection between the lifting device and the car. As here shown, the lifting device or plow has an upwardly-extending arm 22, provided with a slot 23, through which pins or bolts 24 extend to an engagement with a hanger 25 or other fixed portion of a car.

The trolley comprises a pair of rollers 26, mounted, respectively, at the ends of an arm 27 and adapted to run on the working conductor 13. The arm 27 is connected to a plate 28, to the other edge of which plate is connected a similar arm 29, supporting trolleys or rollers 30, which engage with the working conductor 15. As here shown, the arm 29 has a pivotal connection with the plate 28, whereby the said arms 27 and 29 may have a vertical rocking motion one relatively to the other, so as to accommodate the trolley to the vertical movements of the collector-sections. The arms 27 and 29 are of course in electrical connection with the respective rollers 26 and 30, and these arms are insulated one from the other and have insulated uprights 31, extended upward and insulated one from the other between the guard-plates 7 and through the slot 5. The upper ends of these uprights are turned outward and then upward, and to these outer ends the wires connecting the said parts with the two poles of the motor on the car extend. The outwardly-extended upper portions of the uprights 31 engage against one of the vertical walls of a notch 32, formed in the frame 19. Therefore the trolley will be forced along by the contact of said frame with said upwardly-extended portions, thus providing for a relatively vertical movement between the frame or plow 19 and the trolley.

Having thus described my invention, I claim as new and desire to secure by Letters Patent—

1. In an electric railway, a conduit having a longitudinal slot at its top, and a tubular cable for normally closing said slot, the cable consisting of a spiral coil, the spirals being arranged close together, yet adapted to open or stretch at points lifted from the slot, substantially as specified.

2. In an electric railway, a conduit having a longitudinal slot in its top, inwardly-extended flanges on the walls of said slot, and a tubular cable adapted to normally close the slot and rest on said flanges, the said cable consisting of a spirally-wound wire, whereby said cable may stretch longitudinally, substantially as specified.

3. In an electric railway, a conduit having a longitudinal slot in its top, a flexible and longitudinally-elastic cable for normally closing said slot, and a device carried by a car for raising said cable from the slot, substantially as specified.

4. In an electric railway, a conduit having a longitudinal slot at its top, a flexible and longitudinally-elastic cable for normally closing said slot, a lifter carried by a car and comprising a frame having its upper side inclined from its central portion downward to each end, a cable-supporting roller journaled in said frame, rollers on said frame for engaging on a track, and a vertically-yielding connection between said lifting device and a car, substantially as specified.

5. An electric railway having a conduit provided with a slot and a cable normally lying over and closing the slot, the cable being elastic longitudinally so that it may be raised from the slot by an object running with the car, substantially as described.

HENRY M. JONES.

Witnesses:
JOHN Q. THAYER,
P. E. AUSTIN.